Figures 1, 2, 3, 4:
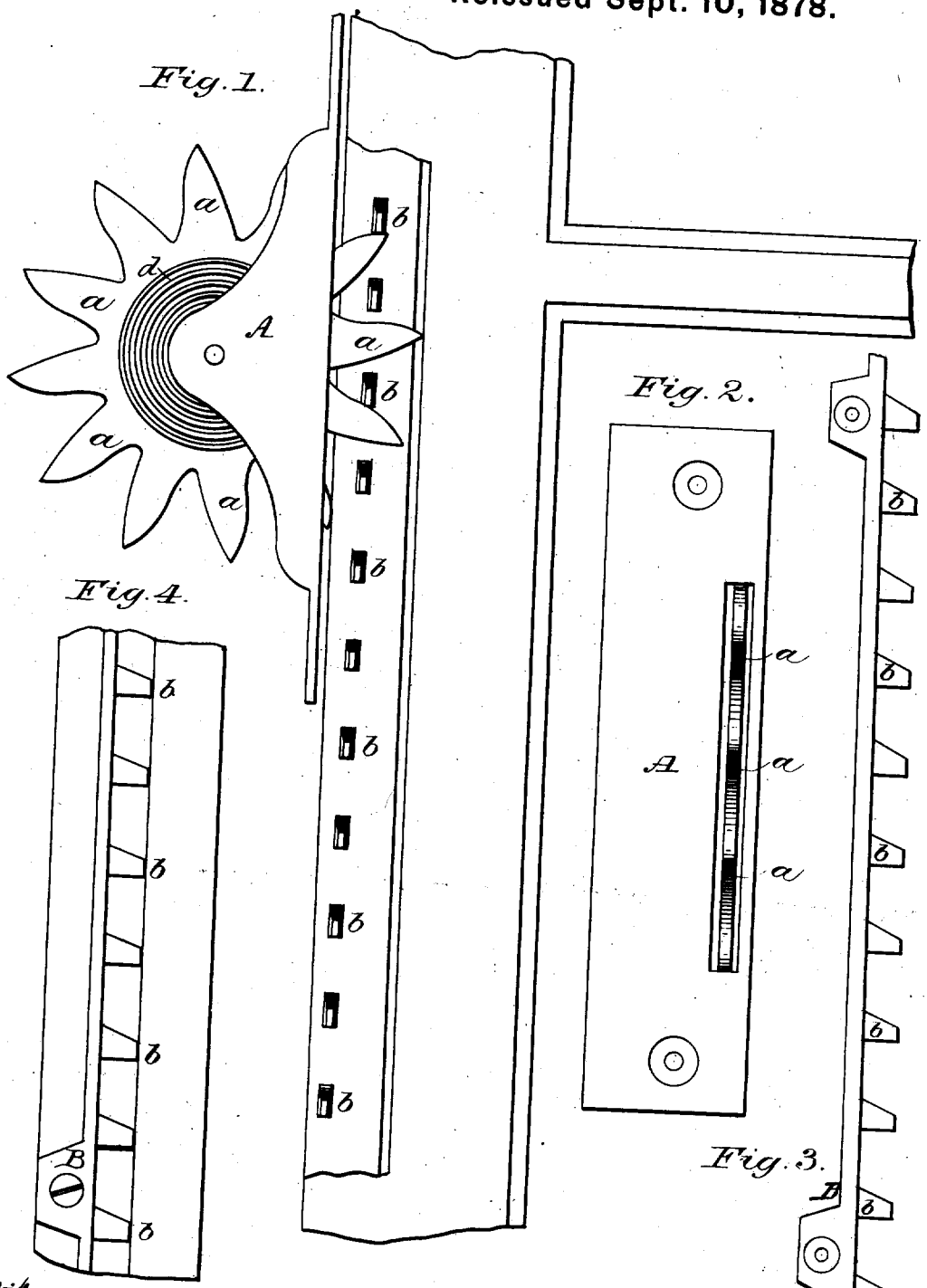

H. F. BOND.
Sash-Balance

No. 8,410. Reissued Sept. 10, 1878.

Witnesses:
P. O. Bond
J. R. Hatch.

Inventor:
Henry F. Bond.

N. PETERS, PHOTO-LITHOGRAPHER, WASHINGTON, D. C.

UNITED STATES PATENT OFFICE.

HENRY F. BOND, OF NORTHBOROUGH, MASSACHUSETTS.

IMPROVEMENT IN SASH-BALANCES.

Specification forming part of Letters Patent No. 205,944, dated July 16, 1878; Reissue No. 8,410, dated September 10, 1878; application filed August 22, 1878.

*To all whom it may concern:*

Be it known that I, HENRY F. BOND, of Northborough, in the county of Worcester and State of Massachusetts, have invented certain Improvements in Sash-Balances, of which the following is a specification:

In the drawings, Figure 1 is a side elevation, partly in section, showing my improved sash-balance applied to a window; and Figs. 2, 3, and 4 are detached views of the rack-bar and other portions of the device.

Like letters of reference indicate like parts.

By referring to the drawings which are annexed to and form part of this specification, it will be seen that my invention consists of a shoe or frame, A, to which is attached a cog-wheel with deep cogs *a a a a*, a spring, *d*, like an ordinary clock-spring, being fastened to it, and a rack, B, with lugs *b b b b*, the position of the lugs of the rack being on an oblique line, so as to be operated upon by the cogs nearer to or farther from the center of the wheel, according as the sash is raised or lowered and the spring is more or less wound up, and consequently more or less powerful. In other words, the varying leverage of the wheel is made to compensate the varying tension of the spring. This may be seen by Fig. 1 of the drawings.

The parts, except the spring, may be made of cast-iron or other suitable material.

The cog-wheel may be attached to the window-frame and the rack to the sash; or, with a little modification of the construction, the rack may be attached to the window-frame and the cog-wheel to the sash.

In applying the invention to ordinary use, it is intended to plow a groove in the edge of the sash and insert the rack, as may be seen by Fig. 4, which represents a fraction of a sash and a fraction of a rack.

The shoe or frame A, with cog-wheel, should be let into the window-frame so as to play into the rack when the sash is put into its place; and opposite to this shoe with cog-wheel another shoe with cog-wheel, or a simple friction-roller, should be placed.

I make no claim to originality in the use of a spring in balancing a sash, or in the construction of the cog-wheel and rack; but

I claim as my invention—

In a sash-balance, a cog-wheel with long teeth, operating, by means of a spring, upon a rack whose teeth or lugs are set obliquely, substantially as described above, and so that the varying tension of the spring shall be offset by the varying leverage of the cog-wheel, as and for the purpose hereinbefore set forth.

HENRY F. BOND.

Witnesses:
J. Q. HATCH,
WM. J. POTTER.